(12) United States Patent
Bisti et al.

(10) Patent No.: US 10,440,139 B2
(45) Date of Patent: *Oct. 8, 2019

(54) PROCESS BROKER FOR EXECUTING WEB SERVICES IN A SYSTEM OF ENGAGEMENT AND SYSTEM OF RECORD ENVIRONMENTS

(71) Applicant: INTERNATIONAL BUSINESS MACHINES CORPORATION, Armonk, NY (US)

(72) Inventors: Jeffrey E. Bisti, New Paltz, NY (US); Tynan J. Garrett, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 15/068,063

(22) Filed: Mar. 11, 2016

(65) Prior Publication Data

US 2017/0264703 A1  Sep. 14, 2017

(51) Int. Cl.
*H04L 29/08* (2006.01)
*H04L 12/24* (2006.01)

(52) U.S. Cl.
CPC ...... *H04L 67/2842* (2013.01); *H04L 41/5051* (2013.01); *H04L 41/5096* (2013.01);
(Continued)

(58) Field of Classification Search
CPC ............ H04L 67/2842; H04L 41/5051; H04L 41/5096; H04L 67/02; H04L 67/1097; H04L 67/16; H04L 67/32
See application file for complete search history.

(56) References Cited

U.S. PATENT DOCUMENTS 6,963,867 B2* 11/2005 Ford ................. G06F 17/30705
707/752
7,487,112 B2* 2/2009 Barnes, Jr. ............. G06Q 10/02
705/26.8
(Continued)

OTHER PUBLICATIONS

IBM "List of IBM Patents or Patent Applications Treated as Related (Appendix P)," Oct. 3, 2016, p. 1-2.
(Continued)

*Primary Examiner* — Tonia L Dollinger
*Assistant Examiner* — Albert Chiou
(74) *Attorney, Agent, or Firm* — Michael O'Keefe

(57) ABSTRACT

A method for implementing an on-premises process broker. The method may include receiving parameter data from a system of engagement, whereby the parameter data includes a query goal. The method may include storing the parameter data in a cache. The method may include preparing a REST call using programming logic based on the parameter data. The method may include transmitting the prepared REST call to a system of record. The method may further include receiving response data from the system of record based on the transmitted REST call. The method may also include updating the parameter data in the cache based on the response data. The method may include determining whether the query goal is satisfied. The method may also include transmitting the parameter data to the system of engagement based on determining the query goal is satisfied.

17 Claims, 7 Drawing Sheets

(52) U.S. Cl.
CPC .......... *H04L 67/02* (2013.01); *H04L 67/1097* (2013.01); *H04L 67/16* (2013.01); *H04L 67/32* (2013.01)

(56) References Cited

U.S. PATENT DOCUMENTS

| | | | |
|---|---|---|---|
| 8,375,048 B1* | 2/2013 | Wad .................. | G06F 17/30672 707/708 |
| 2007/0203747 A1* | 8/2007 | Baharloo .............. | G06Q 30/00 705/2 |
| 2009/0006543 A1* | 1/2009 | Smit .................. | G06F 17/30864 709/203 |
| 2009/0313325 A1* | 12/2009 | Vanecek ............... | G06Q 50/01 709/203 |
| 2010/0042469 A1* | 2/2010 | Chandrasekar .... | G06Q 30/0207 705/14.54 |
| 2010/0070360 A1* | 3/2010 | Gilbert ................. | G06Q 30/02 705/14.19 |
| 2010/0185968 A1 | 7/2010 | Hsu et al. | |
| 2013/0060928 A1 | 3/2013 | Shao | |
| 2015/0229645 A1 | 8/2015 | Keith et al. | |
| 2015/0256603 A1 | 9/2015 | Pillai et al. | |

OTHER PUBLICATIONS

Bisti et al., "Process Broker for Executing Web Services in a System of Engagement and System of Record Environments," Application and Drawings, Filed on Jun. 22, 2016, 35 Pages, U.S. Appl. No. 15/189,361.

Boyd, "API Aggregation: Why It Matters and Eight Different Models," ProgrammableWeb, Dec. 13, 2013, p. 1-12, http://www.programmableweb.com/news/api-aggregation-why-it-matters-and-eight-different-models/2013/12/13, Accessed on Mar. 7, 2016.

Hudson et al., "Identifying Transformation Maps Based on Input and Output Formats," Application and Drawings, Filed on Aug. 21, 2015, p. 1-25, U.S. Appl. No. 141832,025.

Maskov, "Implementing REST Client for Android," Helsinki Metropolia University of Applied Sciences Thesis, Apr. 8, 2015, p. 1-58.

Mell et al., "The NIST Definition of Cloud Computing," National Institute of Standards and Technology, Sep. 2011, p. 1-3, Special Publication 800-145.

Pujol, "Extending Rest APIs with API Aggregator," 3SCALE Tech Blog, Apr. 18 2013, p. 1-6, http://tech.3scale.net/2013/04/18/accelerate-your-mobile-api-with-nginx-and-lua/, Accessed on Mar. 7, 2016.

Stecca et al., "Scalable Service Composition Execution through Asynchronous I/O," IEEE 10th International Conference on Services Computing, 2013, p. 312-319, IEEE Computer Society.

Wagener et al., "XMPP for Cloud Computing in Bioinformatics Supporting Discovery and Invocation of Asynchronous Web Services," BMC Bioinformatics, Sep. 4, 2009, p. 1-12, BioMed Central Ltd.

* cited by examiner

PROCESS BROKER FOR EXECUTING WEB SERVICES IN A SYSTEM OF ENGAGEMENT AND SYSTEM OF RECORD ENVIRONMENTS

BACKGROUND

The present invention relates generally to the field of computing, and more particularly to cloud computing.

Cloud computing relates to the sharing of resources, data, and information across a number of computers within a network. Cloud computing allows users to store, process, and share large amounts of information quickly within linked together third party storage devices, such as servers and datacenters. Various types of cloud computing deployment models exist, such as a private cloud, community cloud, public cloud, or hybrid cloud. Furthermore, entering into a cloud computing model may be inexpensive for users since the cost for adopting a cloud computing model may only be a fee paid to a service provider to store and process the user data. Additionally, cloud computing service models may include Software as a Service (SaaS), Platform as a Service (PaaS), or Infrastructure as a Service (IaaS).

SUMMARY

According to one embodiment, a method for implementing an on-premises process broker. The method may include receiving, by a processor, a plurality of parameter data from a system of engagement, whereby the plurality of received parameter data includes a query goal. The method may also include storing the plurality of received parameter data in a cache. The method may further include preparing a representational state transfer (REST) call using a plurality of programming logic based on the plurality of stored parameter data. The method may also include transmitting the prepared REST call to a system of record. The method may further include receiving a plurality of response data from the system of record based on the transmitted REST call. The method may also include updating the plurality of stored parameter data in the cache based on the plurality of received response data. The method may further include determining whether the query goal is satisfied. The method may also include transmitting the plurality of updated parameter data to the system of engagement based on determining the query goal is satisfied.

According to another embodiment, a computer system for implementing an on-premises process broker. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving a plurality of parameter data from a system of engagement, whereby the plurality of received parameter data includes a query goal. The computer system may also include storing the plurality of received parameter data in a cache. The computer system may further include preparing a REST call using a plurality of programming logic based on the plurality of stored parameter data. The computer system may also include transmitting the prepared REST call to a system of record. The computer system may further include receiving a plurality of response data from the system of record based on the transmitted REST call. The computer system may also include updating the plurality of stored parameter data in the cache based on the plurality of received response data. The computer system may further include determining whether the query goal is satisfied. The computer system may also include transmitting the plurality of updated parameter data to the system of engagement based on determining the query goal is satisfied.

According to yet another embodiment, a computer program product for implementing an on-premises process broker. The computer program product may include one or more computer-readable storage devices and program instructions stored on at least one of the one or more tangible storage devices, the program instructions executable by a processor. The computer program product may include program instructions to receive a plurality of parameter data from a system of engagement, whereby the plurality of received parameter data includes a query goal. The computer program product may also include program instructions to store the plurality of received parameter data in a cache. The computer program product may further include program instructions to prepare a REST call using a plurality of programming logic based on the plurality of stored parameter data. The computer program product may also include program instructions to transmit the prepared REST call to a system of record. The computer program product may further include program instructions to receive a plurality of response data from the system of record based on the transmitted REST call. The computer program product may also include program instructions to update the plurality of stored parameter data in the cache based on the plurality of received response data. The computer program product may further include program instructions to determine whether the query goal is satisfied. The computer program product may also include program instructions to transmit the plurality of updated parameter data to the system of engagement based on determining the query goal is satisfied.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
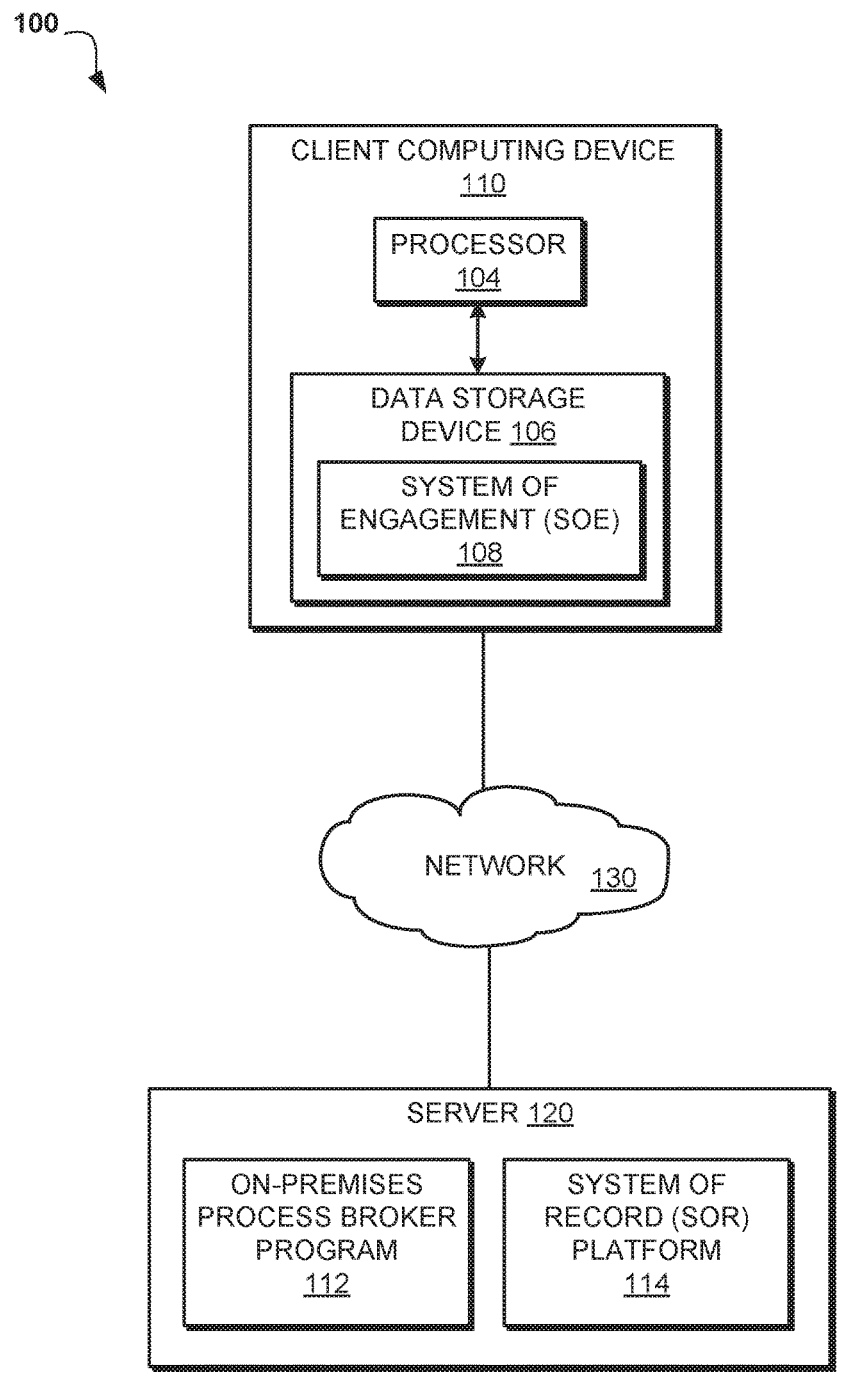
FIG. 1 illustrates an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to cloud computing. The following described exemplary embodiments provide a system, method, and program product to, among other things, implement an on-premises process broker that acts as an intermediary representational state transfer (REST) processing agent between a System of Engagement (SoE) and a System of Record (SoR). Therefore, the present embodiment has the capacity to improve the technical field of cloud computing by increasing the processing speed and simplification of REST calls implemented in environments where a single endpoint on an external network queries several services residing within one or more data centers. More specifically, an application designer may be capable of describing a workflow of REST calls that make accommodations for basic data transformation and conditional logic. Furthermore, by employing an on-premises process broker solution to facilitate the execution of high input/output (TO) SoR tasks, expensive network and SoE processing resources may be made available and complex workloads may execute in a more efficient manner.

As previously described, cloud computing relates to the sharing of resources, data, and information across a number of computers within a network. Cloud computing allows users to store, process, and share large amounts of information quickly within linked together third party storage devices, such as servers and data centers. Various types of cloud computing deployment models exist, such as a private cloud, community cloud, public cloud, or hybrid cloud. Furthermore, entering into a cloud computing model may be inexpensive for users since the cost for adopting a cloud computing model may only be a fee paid to a service provider to store and process the user data. Additionally, cloud computing service models may include Software as a Service (SaaS), Platform as a Service (PaaS), or Infrastructure as a Service (IaaS).

Due to the increased reliance of digital commerce on the real-time processing of large amounts of data, cloud technology has introduces a decentralized, modular architectural approach to organizational access to information. Typical cloud architecture relies on establishing small, consumable services, which may be used by application without the need for case specific integration. Integrating new functionality may become simpler by implementing REST-enabled application programming interfaces (APIs). However, implementing REST-based APIs may create a system heavily reliant on request/response transmission lines. In a typical situation implementing such a system, a typical application may query one service request to retrieve information, another service request to process the retrieved information, yet another service request to compare the processed information to another set of data, and then continue building working data sets in a similar fashion.

A SoE may relate to a user-facing application. A SoE may include a graphical user interface that enables a user to interact with the application thereby allowing for the input of data, such as text data, numerical data, and image data. Using a relatively small amount of input data and seeking a relatively simplistic end result, a SoE may invoke multiple REST calls which may return and/or process large quantities of data.

A SoR may relate to a system implemented to store information. A SoR may be a single computer or any combination of connected computers, such as IBM Parallel Sysplex® (IBM Parallell Sysplex and all IBM Parallell Sysplex-based trademarks and logos are trademarks or registered trademarks of International Business Machines Corporation and/or its affiliates). A SoR may be capable of providing several discrete services with varying uniform resource identifiers (URIs). For large-scale enterprise systems, the probability that a SoE will make several REST calls to services residing within the same SoR increases. Under such circumstances, transmissions to and from such services may become architecturally redundant and expensive since network resources and overall processing time may be utilized to transmit duplicate information between SoEs and SoRs.

A typical approach to solve such a situation may include creating an application on the SoR that processes REST calls from the application specifically. Such a system may be used to simplify development but may be far less flexible and forces rigid specificity during integration. Furthermore, an application developer may not make changes to the application without also changing the SoR application, since the two systems must remain synchronized. Another approach may involve allowing the SoE to process each REST call to the SoR services on an as needed basis. This type of approach may require significant overhead input/output (I/O), which is inefficient for lightweight applications and portable devices. Yet another approach may include using an API aggregator, which may allow a developer to create a unique sequence of APIs to leverage along a path leading to a final result. Using an API aggregator may provide a more flexible approach than simply coding new methods on the SoR, however, this flexibility is achieved by simply shifting the processing work to the SoE. As such, it may be advantageous, among other things, to implement a system that utilizes an on-premises process broker that may act as an intermediary REST processing agent between SoEs and SoRs.

According to one embodiment, an on-premises process broker may be connected to a SoE and a SoR. Once initiated, the on-premises process broker may allow for multiple REST-enabled calls to be made asynchronously and assembled as the data becomes available using high-speed data stores to cache results rather than retransmit the data to the SoE. Therefore, an on-premises process broker may allow for large stores of data to be retrieved and analyzed on-site without intermediate payloads leaving the datacenter's high speed, secure network. Additionally, the SoE may only be required to prepare the initial request parameters and collect the final output from the on-premises process broker. Furthermore, an on-premises process broker may not require a new, unique API for each call as may be required by API aggregation.

In addition to specifying a series of services to use, the on-premises process broker may allow programmers and architects to write conditional statements. For example, if a query sent to one database returns zero results, the process broker may attempt another query without requiring the process to break or return to the initiating program. By allowing for the inclusion of basic logic and dynamic paths, a workflow can be routed to systems and services that provide a great value or insight for the user or application. Such complexity, which may only arise during execution, may prevent the initiating requestor from having to capture and recompose the initial request using different parameters.

Since the on-premises process broker may need to be aware of available services and acceptable parameters to receive and return to and from the SoE, the process broker may be capable of accepting extensible markup language (XML) descriptors or web service definition language (WSDL) files. Furthermore, the endpoint consumer SoE may consider the on-premises process broker as a single consumable REST service that is provided with a set of inputs and a workflow descriptor that details which REST URIs are to be used. Since expected output from one web service may not fully match with the input from a subsequent web service, integrated facilities for data parsing filtering, and transformation may be provided to act as a connection between REST calls.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product that utilizes an on-premises process broker to perform as an intermediary between a SoE and a SoR. The process broker may include logic that allows for the asynchronous creation and transmission of REST calls to the SoR and analyzation of received data from the SoR. Upon receiving responsive data from the SoR, the process broker may be capable of determining whether any follow up information may be needed in lieu of the received responsive data. If additional data is needed from within the SoR, the process broker may prepare subsequent REST calls to retrieve the additional data. The process broker may iterate through the steps of preparing REST calls and determining if follow up data is needed until the goal of the received query from the SoE is satisfied. Once the query goal is satisfied, the process broker may transmit the complete data package back to the SoE for review by a user.

Referring to FIG. 1, an exemplary networked computer environment 100 is depicted, in accordance with one embodiment. The networked computer environment 100 may include a client computing device 110 and a server 120 interconnected via a communication network 130. According to at least one implementation, the networked computer environment 100 may include a plurality of client computing devices 110 and servers 120, only one of each being shown for illustrative brevity.

The communication network 130 may include various types of communication networks, such as a wide area network (WAN), local area network (LAN), a telecommunication network, a wireless network, a public switched network and/or a satellite network. The communication network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 110 may include a processor 104 and a data storage device 106 that is enabled to host a software program, such as SoE 108, and communicate with the server 120 via the communication network 130, in accordance with one embodiment of the invention. The client computing device 110 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 110 may include internal components 502a and external components 504a, respectively.

The server computer 120 may be a laptop computer, netbook computer, personal computer (PC), a desktop computer, or any programmable electronic device or any network of programmable electronic devices capable of hosting an On-Premises Process Broker Program 112 and SoR platform 114 and communicating with the client computing device 110 via the communication network 130, in accordance with embodiments of the invention. As will be discussed with reference to FIG. 5, the server computer 120 may include internal components 502b and external components 504b, respectively. The server 120 may also operate in a cloud computing service model, such as Software as a Service (SaaS), Platform as a Service (PaaS), or Infrastructure as a Service (IaaS). The server 120 may also be located in a cloud computing deployment model, such as a private cloud, community cloud, public cloud, or hybrid cloud.

According to the present embodiment, the On-Premises Process Broker Program 112 may be a program capable of receiving query parameters from the SoE 108, creating and executing a REST call to the SoR 114 based on the received query parameters, receiving query results from the SoR platform 114, creating and executing subsequent REST calls to the SoR 114 based on the received query results, and transmitting finalized data to the SoE 108 once a query goal has been satisfied. The On-Premises Process Broker Program 112 is explained in further detail below with respect to FIG. 2.

The SoE 108 may be a user-facing application that includes a graphical user interface enabled to allow a user to interact with the application thereby allowing for the input of data, such as text data, numerical data, and image data. Furthermore, the SoE 108 may be capable of transmitting the user entered data to the On-Premises Process Broker Program 112.

The SoR 114 may be a system implemented to store information. Additionally, the SoR 114 may be capable of receiving and processing REST calls from the On-Premises Process Broker Program 112.

Figure 2:
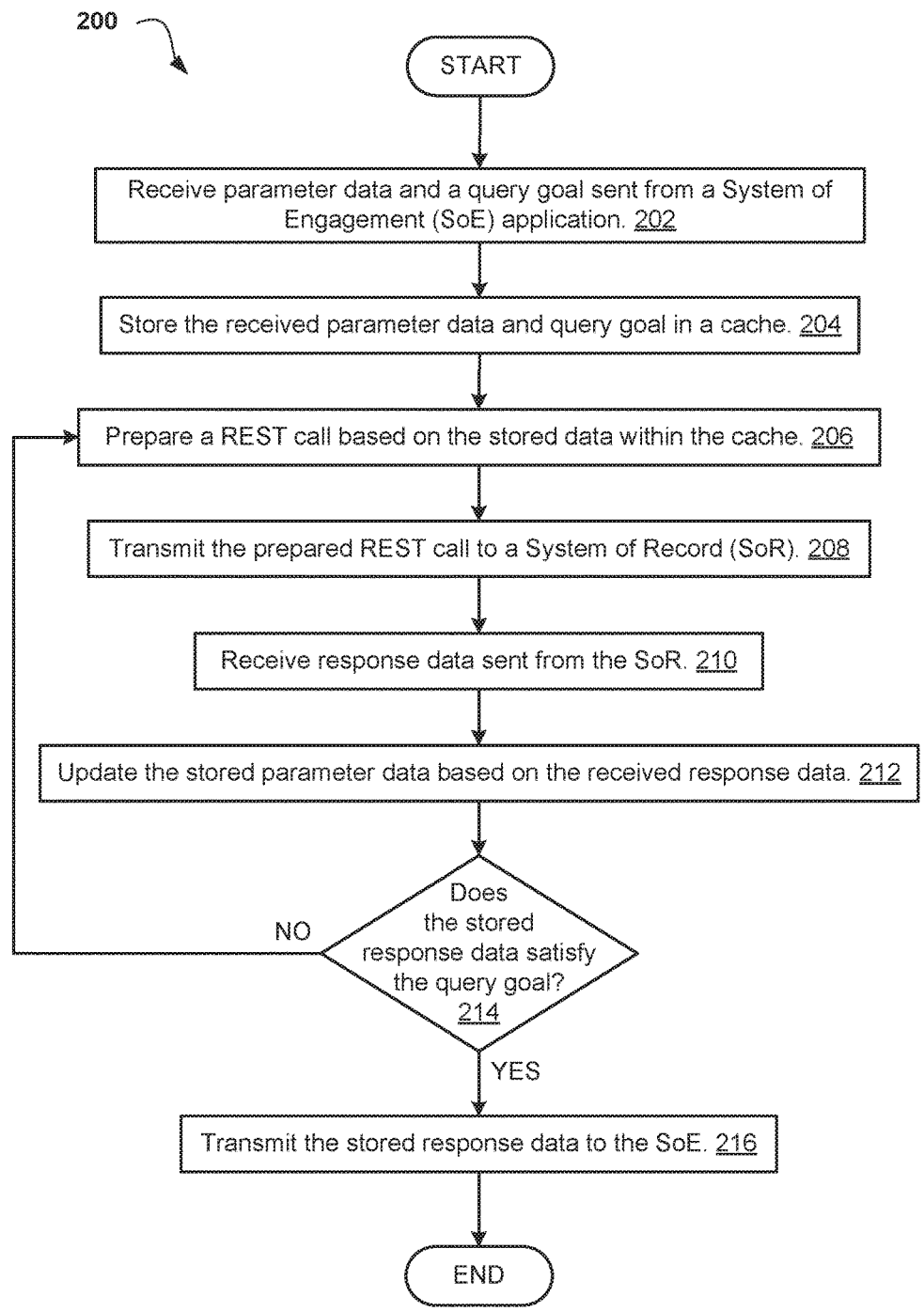
FIG. 2 is an operational flowchart illustrating an on-premises process broker system, in accordance with one embodiment of the present invention.

Referring now to FIG. 2, an operational flowchart 200 illustrating an on-premises process broker system is depicted, in accordance with one embodiment of the present invention. At 202, the On-Premises Process Broker Program 112 (FIG. 1) receives parameter data from the SoE 108 (FIG. 1). When a user interacts with the SoE 108 (FIG. 1) through a graphical user interface (GUI), the user may submit a request to the SoE 108 (FIG. 1). In order to process the request, the SoE 108 (FIG. 1) may prepare parameter data to send to the On-Premises Process Broker Program 112 (FIG. 1) for processing. Furthermore, the received parameter data may relate to criteria necessary for the On-Premises Process Broker Program 112 (FIG. 1) to achieve the query goal. The received parameter data may be a variety of user-submitted data, such as a picture, a video, an identification number, a model number, a serial number, a barcode, a quick response code, a product name, and a brand name. The received parameter data may include a query goal, which may relate to a specific result the user wishes to receive. For example, if a user is interacting with a retail shopping application while browsing a brick-and-mortar store, the retail shopping application may be the SoE 108 (FIG. 1). If the user sees a product while browsing the brick-and-mortar store, the user may submit the product barcode into the retail shopping application associated with the brick-and-mortar store. If the user requests to see what colors and models are available for the item, the retail shopping application may submit the user-submitted barcode to the On-Premises Process Broker Program 112 (FIG. 1) as the parameter data and a query goal of all available colors and all available models for the item.

Next at 204, the On-Premises Process Broker Program 112 (FIG. 1) stores the received parameter data in a cache. Once the parameter data has been received from the SoE 108 (FIG. 1), the On-Premises Process Broker Program 112 (FIG. 1) may store the received parameter data in a cache so that each item of received parameter data may be used to prepare one or more REST calls needed to gather and process data stored within SoR 114 (FIG. 1).

Then at 206, the On-Premises Process Broker Program 112 (FIG. 1) prepares a REST call based on the stored parameter data within the cache. Once the received parameter data is stored within the cache, the On-Premises Process Broker Program 112 (FIG. 1) may prepare a REST call that may gather information required to achieve the query goal. The On-Premises Process Broker Program 112 (FIG. 1) may prepare the REST call by analyzing the stored parameter data. For example, in the previously described example relating to a user submitting a product barcode from a brick-and-mortar retailer, the On-Premises Process Broker Program 112 (FIG. 1) may prepare a REST call to be sent to SoR 114 (FIG. 1) that instructs the SoR 114 (FIG. 1) to search a repository, such as a database, of all retailer products for a product with the user-submitted barcode.

If the On-Premises Process Broker Program 112 (FIG. 1) has previously transmitted a REST call to SoR 114 (FIG. 1), response data from the previously transmitted REST call may already be stored within the cache. Implementing programming logic technology, the On-Premises Process Broker Program 112 (FIG. 1) may utilize stored response data in addition to the stored parameter data and the stored query goal when preparing the REST call. For example, if the On-Premises Process Broker Program 112 (FIG. 1) has already received and stored response data from SoR 114 (FIG. 1) identifying the particular product with which a user-submitted barcode is associated, the On-Premises Process Broker Program 112 (FIG. 1) may use the stored response data to prepare a REST call that, when executed, may return information detailing various models, additions, or colors available for the identified product.

Next at 208, the On-Premises Process Broker Program 112 (FIG. 1) transmits the prepared REST call to the SoR 114 (FIG. 1). Once the REST call is prepared, the On-Premises Process Broker Program 112 (FIG. 1) may transmit the REST call to the SoR 114 (FIG. 1) for execution. The SoR 114 (FIG. 1) may process the transmitted REST call by searching one or more repositories for the applicable data. For example, if the SoR 114 (FIG. 1) receives a transmitted REST call requesting a product associated with a barcode, the SoR 114 (FIG. 1) may search a repository for the product information. Once located, the SoR 114 (FIG. 1) may transmit the located product information to the On-Premises Process Broker Program 112 (FIG. 1). Furthermore, the On-Premises Process Broker Program 112 (FIG. 1) may transmit the same prepared REST call to multiple, different SoRs 114 (FIG. 1) for execution. Additionally, if the On-Premises Process Broker Program 112 (FIG. 1) has prepared the REST call using received response data, the On-Premises Process Broker Program 112 (FIG. 1) may transmit the prepared REST call to the same SoR 114 (FIG. 1) or a different SoR 114 (FIG. 1) than the SoR 114 (FIG. 1) that returned the response data used to prepare the REST call being transmitted. For example, if response data was received from a first SoR 114 (FIG. 1) and, subsequently, the received response data was used to prepare a REST call, the prepared REST call may be transmitted to either the first SoR 114 (FIG. 1) or a second SoR 114 (FIG. 1) separate and distinct from the first SoR 114 (FIG. 1).

Then at 210, the On-Premises Process Broker Program 112 (FIG. 1) receives response data set from the SoR 114 (FIG. 1). The received response data may include information applicable to satisfy the request sent by the On-Premises Process Broker Program 112 (FIG. 1) in the form of the transmitted REST call. For example, in the previously described example involving a user submitting a barcode to the On-Premises Process Broker Program 112 (FIG. 1), the response data may include product information necessary for the On-Premises Process Broker Program 112 (FIG. 1) to identify the product associated with the user-submitted barcode.

Next at 212, the On-Premises Process Broker Program 112 (FIG. 1) updates the stored parameter data based on the received response data. The On-Premises Process Broker Program 112 (FIG. 1) updates the stored parameter data by storing the received response data in the cache. Once the On-Premises Process Broker Program 112 (FIG. 1) receives response data from SoR 114 (FIG. 1), the On-Premises Process Broker Program 112 (FIG. 1) may store the received response data within the cache along with the already stored parameter data and query goal.

Then at 214, the On-Premises Process Broker Program 112 (FIG. 1) determines whether the stored response data within the cache satisfied the stored query goal. According to one implementation, the method may continue along the operational flowchart 200 if the stored response data within the cache satisfied the stored query goal. For example, if the stored query goal is to find a variety of colors available for a product, the On-Premises Process Broker Program 112 (FIG. 1) may proceed through several REST calls to identify the product from a user-submitted barcode, find the product within a retailer's inventory, find available colors for the product, and find product availability for each product color in the user's location. Once the On-Premises Process Broker Program 112 (FIG. 1) has accumulated all information needed to display a satisfactory response to the user, the On-Premises Process Broker Program 112 (FIG. 1) may determine that the stored response data satisfies the stored query goal. If the On-Premises Process Broker Program 112 (FIG. 1) determines the stored response data within the cache satisfied the stored query goal (step 214, "YES" branch), the On-Premises Process Broker Program 112 (FIG. 1) may continue to step 216 to transmit the stored response data to the SoE 108 (FIG. 1). If the On-Premises Process Broker Program 112 (FIG. 1) determines the stored response data within the cache does not satisfy the stored query goal (step 214, "NO" branch), the operational flowchart 200 may return to step 206 to prepare a REST call based on the stored data within the cache.

Next at 216, the On-Premises Process Broker Program 112 (FIG. 1) transmits the stored response data to the SoE 108 (FIG. 1). Upon determining the stored response data satisfies the stored query goal, the On-Premises Process Broker Program 112 (FIG. 1) may transmit the stored response data to the SoE 108 (FIG. 1) for display to the user through a GUI associated with the SoE 108 (FIG. 1). For example, if the On-Premises Process Broker Program 112 (FIG. 1) determines the stored response data satisfies the stored query goal of finding available product colors in the user's current location, the On-Premises Process Broker Program 112 (FIG. 1) may transmit the stored response data to the SoE 108 (FIG. 1) so that the SoE 108 (FIG. 1) can display the color availabilities for the product to the user.

It may be appreciated that FIG. 2 provides only an illustration of one implementation and does not imply any limitations with regard to how different embodiments may be implemented. Many modifications to the depicted environments may be made based on design and implementation requirements. For example, the On-Premises Process Broker Program 112 (FIG. 1) may process a string of REST calls that includes one or more REST calls to third-party services and one or more REST calls that may be processed on-premises. Therefore, the On-Premises Process Broker Program 112 (FIG. 1) may allow for third-party processing capabilities thereby negating the need to separate REST calls to third-party services into separate strings.

Figure 3:
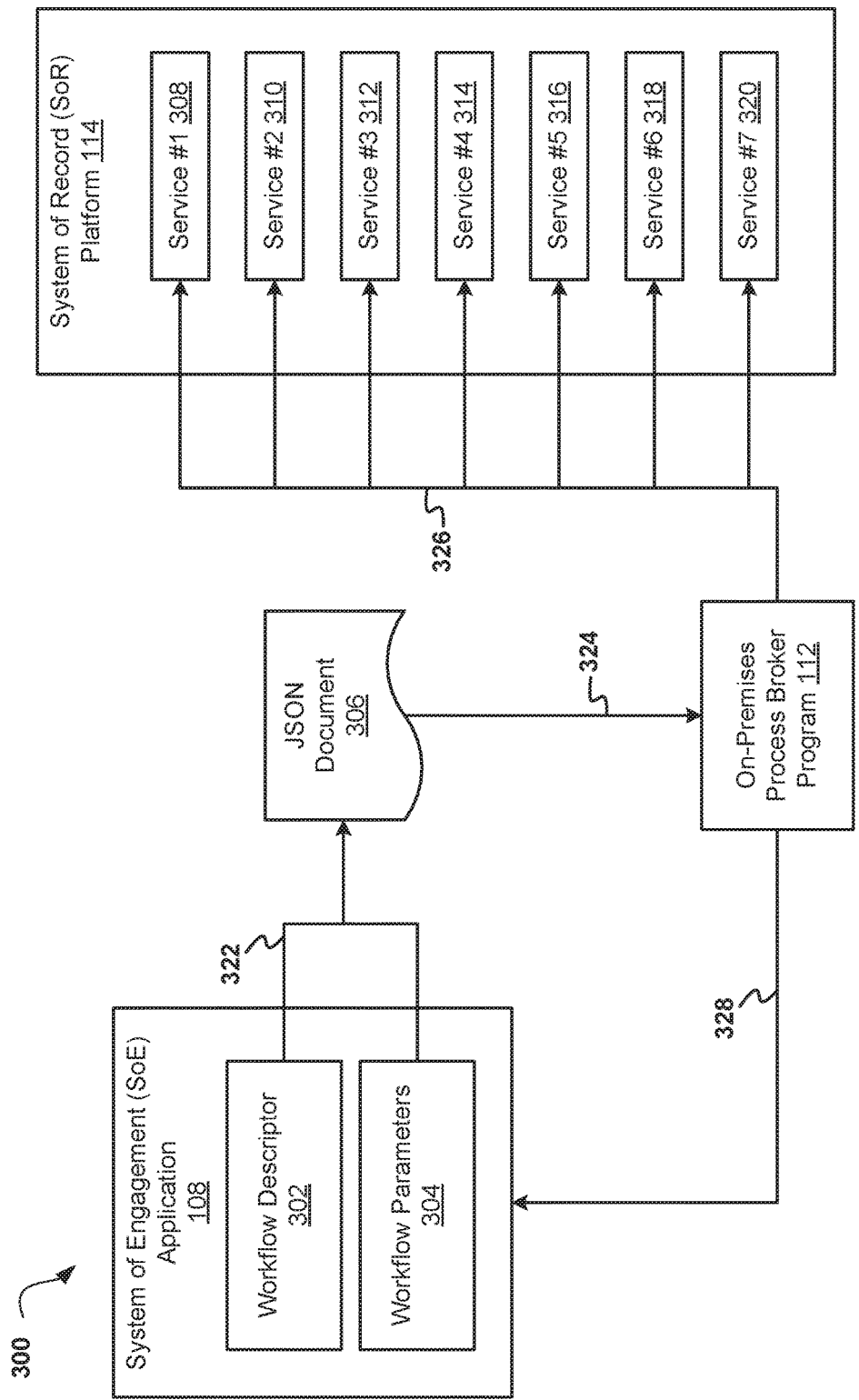
FIG. 3 is a functional block diagram of an on-premises process broker system, in accordance with one embodiment of the present invention.

Referring now to FIG. 3, a functional block diagram 300 of an on-premises process broker system is depicted, in accordance with one embodiment of the present invention. At 322, when preparing to send a request to the On-Premises Process Broker Program 112 (FIG. 1), the SoE 108 (FIG. 1) may create a document, such as a JavaScript Object Notation (JSON) document 306, which details the workflow descriptor 302 and the workflow parameters 304. The workflow descriptor 302 may relate to the services that are available on the SoR 114 (FIG. 1). Additionally, the workflow parameters 304, or parameter data, may relate to the steps required to be taken by the On-Premises Process Broker Program 112 (FIG. 1) and the desired final result of the query the SoE 108 (FIG. 1) is executing. Furthermore, operations that are not dependent on the results of other operations may be executed immediately, such as operations requiring consumer-supplied data. However, the assembly of any information resulting from early operations may be queued until all necessary inputs are available. Next at 324, the On-Premises Process Broker Program 112 (FIG. 1) may receive the document created by the SoE 108 (FIG. 1). Then at 326, the On-Premises Process Broker Program 112 (FIG. 1) may iterate through a process of REST call creation and execution to a number of services 308-320 within the SoR 114 (FIG. 1). Once each query is executed, the SoR 114 (FIG. 1) may transmit responsive data from each query to the On-Premises Process Broker Program 112 (FIG. 1). Furthermore, each subsequent REST call within the iterative process may be created using data received from an earlier REST call response. For example, when creating a REST call to search Service #3 312, the On-Premises Process Broker Program 112 (FIG. 1) may use response data received from Service #1 308 and Service #2 310. Additionally, the On-Premises Process Broker Program 112 (FIG. 1) may utilize programming logic when determining subsequent REST calls. For example, if the On-Premises Process Broker Program 112 (FIG. 1) identifies the product associated with a barcode based on a query to Service #1 308, then the On-Premises Process Broker Program 112 (FIG. 1) may use programming logic to determine a subsequent query to Service #2 310 to search for color variations available for the identified product. The On-Premises Process Broker Program 112 (FIG. 1) may continue through the iterative creation and execution of REST calls until the On-Premises Process Broker Program 112 (FIG. 1) determines the query goal, as indicated in the workflow parameters 304, has been achieved. Next at 328, once the On-Premises Process Broker Program 112 (FIG. 1) has achieved the query goal within the workflow parameters 304, the On-Premises Process Broker Program 112 (FIG. 1) may transmit a prepared package of data to the SoE 108 (FIG. 1) detailing the query results.

Figure 4:
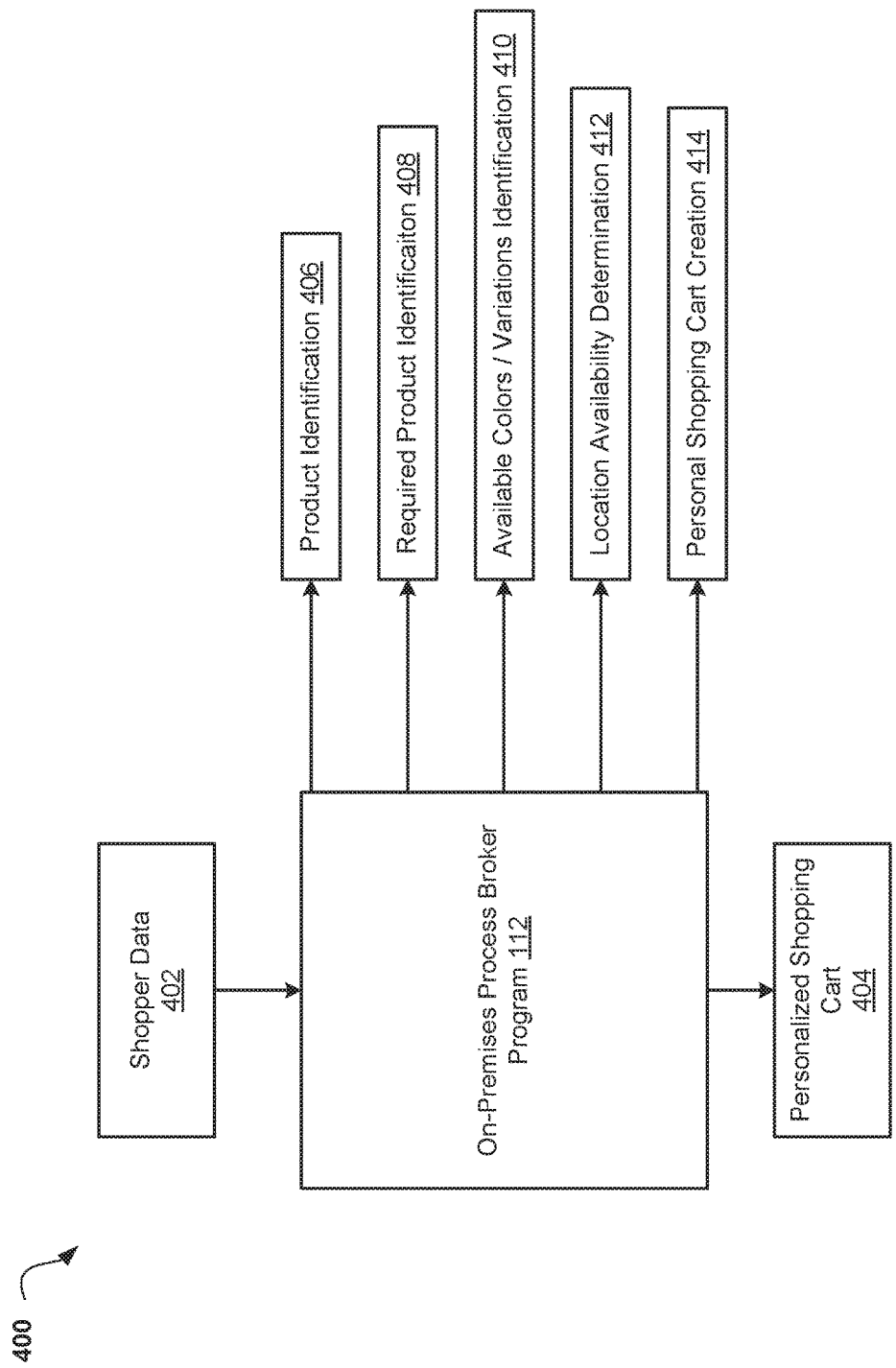
FIG. 4 is a functional block diagram of an example use case process for an on-premises process broker system, in accordance with one embodiment of the present invention.

Referring now to FIG. 4, a functional block diagram 400 of an example use case process for an on-premises process broker system is depicted, in accordance with one embodiment of the present invention. Shopper data 402, such as a picture, a video, an identification number, a model number, a serial number, a barcode, a quick response code, a product name, and a brand name, may be received as an input to the On-Premises Process Broker Program 112 (FIG. 1). The shopper data 402 may include a workflow descriptor 302 (FIG. 3) and workflow parameters 304 (FIG. 3). If the received shopper data 402 is a picture of a product, the On-Premises Process Broker Program 112 (FIG. 1) may search a number of sources within the SoR 114 (FIG. 1). For example, the On-Premises Process Broker Program 112 (FIG. 1) may first perform a product identification process 406 to identify the product in the received image. Then, the On-Premises Process Broker Program 112 (FIG. 1) may perform a required product identification process 408 to determine any other products needed to use the identified product, such as batteries for a portable electronic device. Next, the On-Premises Process Broker Program 112 (FIG. 1) may perform an available color/variation identification 410 to determine color options and model variations available for the identified product. Then, the On-Premises Process Broker Program 112 (FIG. 1) may perform a location availability determination process 412 to determine which colors/variations of the identified product are available at the user's location. Next, once the query goal has been satisfied by locating the colors and product variations available at the user's location, the On-Premises Process Broker Program 112 (FIG. 1) may perform a personal shopping cart creation process 414 so that responsive data may be transmitted to the SoE 108 (FIG. 1) to display query results to the user as personalized shopping cart 404.

Figure 5:
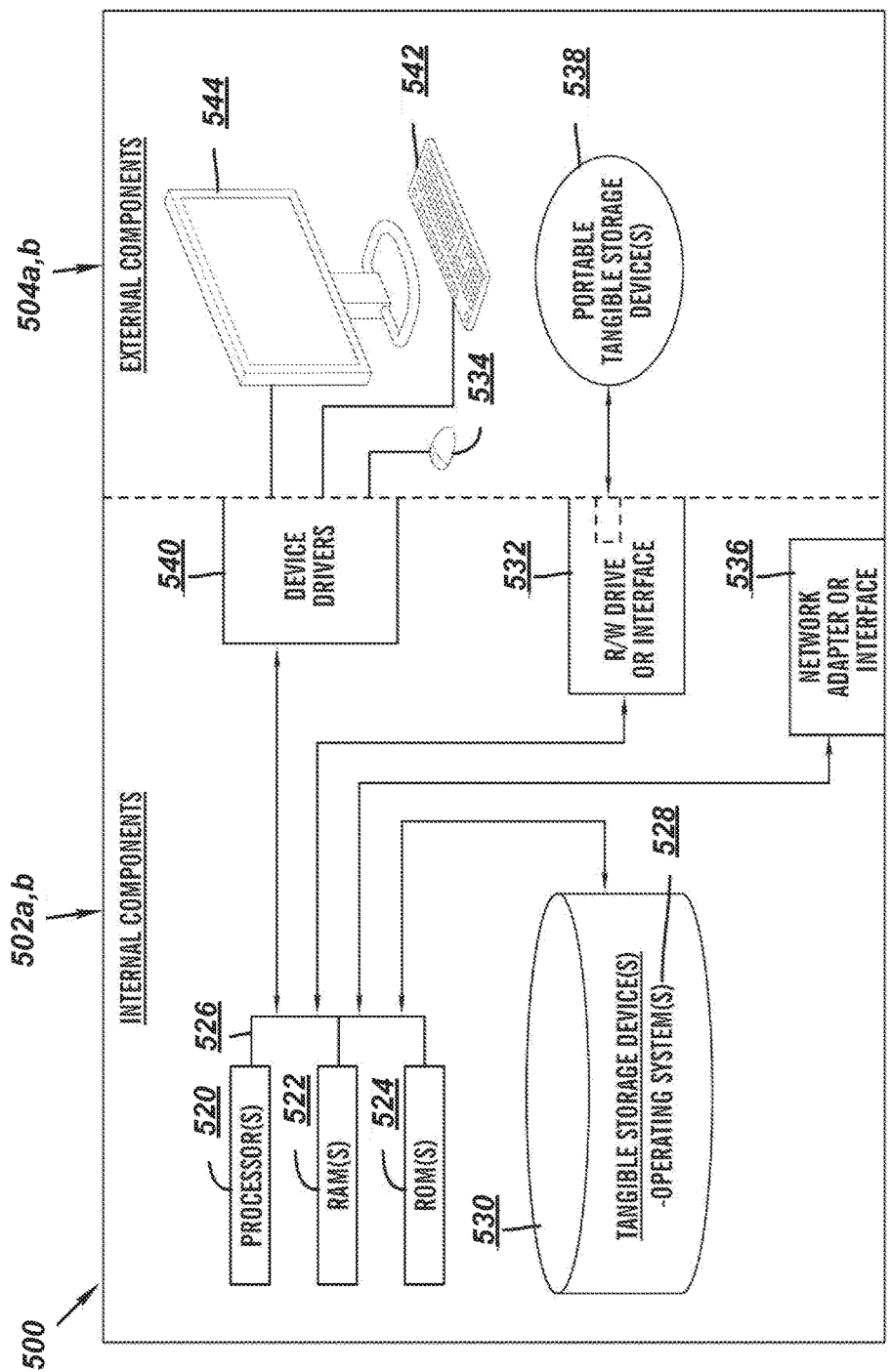
FIG. 5 is a block diagram of internal and external components of computers and servers depicted in FIG. 1 according to at least one embodiment.

FIG. 5 is a block diagram 500 of internal and external components of the client computing device 110 and the server 120 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 110 (FIG. 1) and the server 120 (FIG. 1) may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the SoE 108 (FIG. 1) in the client computing device 110 (FIG. 1), and the On-Premises Process Broker Program 112 (FIG. 1) and SoR 114 (FIG. 1) in the server 120 (FIG. 1) are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the On-Premises Process Broker Program 112 (FIG. 1), can be stored on one or more of the respective portable computer-readable tangible storage devices 538, read via the respective R/W drive or interface 532 and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The SoE 108 (FIG. 1) in the client computing device 110 (FIG. 1) and the On-Premises Process Broker Program 112 (FIG. 1) and SoR 114 (FIG. 1) in the server 120 (FIG. 1) can be downloaded to the client computing device 110 (FIG. 1) and the server 120 (FIG. 1) from an external computer via a network (for example, the Internet, a local area network or other, wide area network) and respective network adapters or interfaces 536. From the network adapters or interfaces 536, the SoE 108 (FIG. 1) in the client computing device 110 (FIG. 1) and the On-Premises Process Broker Program 112 (FIG. 1) and SoR 114 (FIG. 1) in the server 120 (FIG. 1) are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
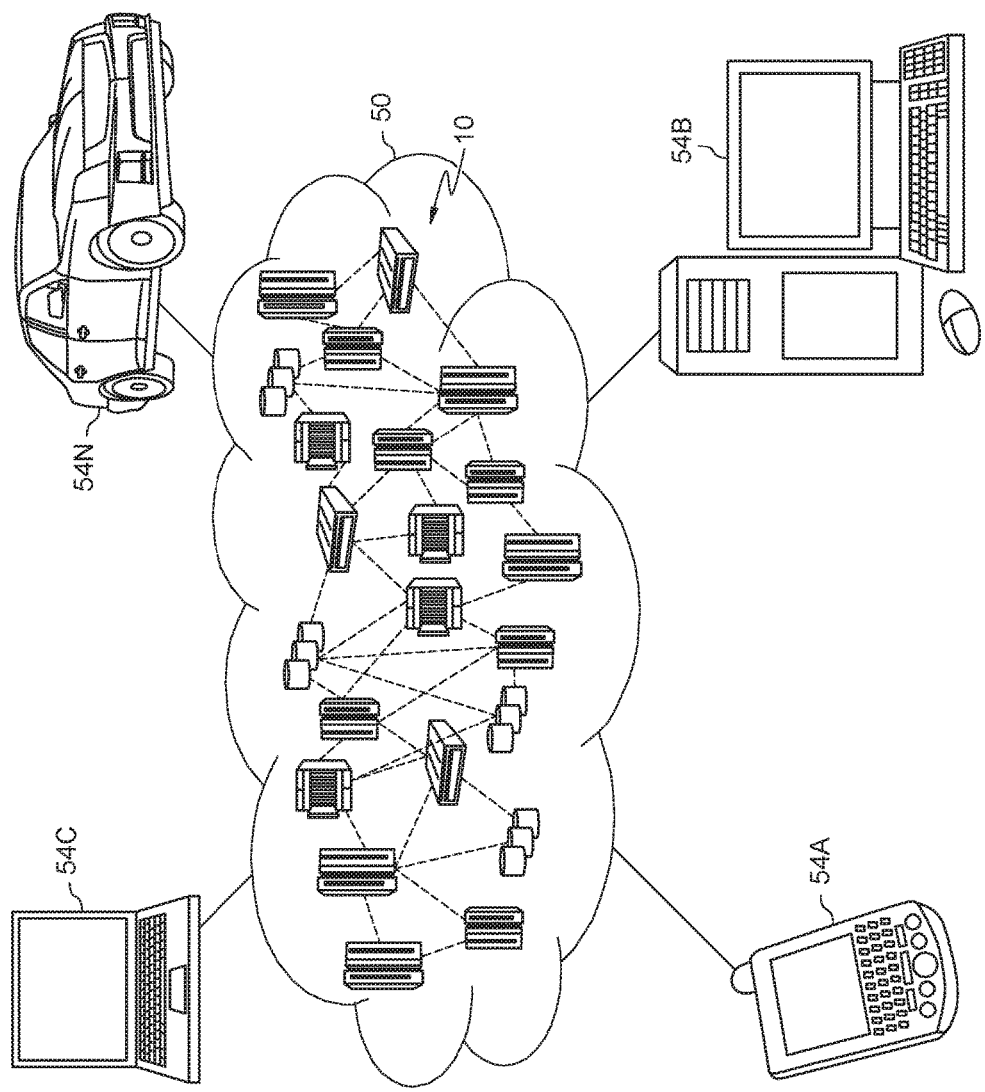
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
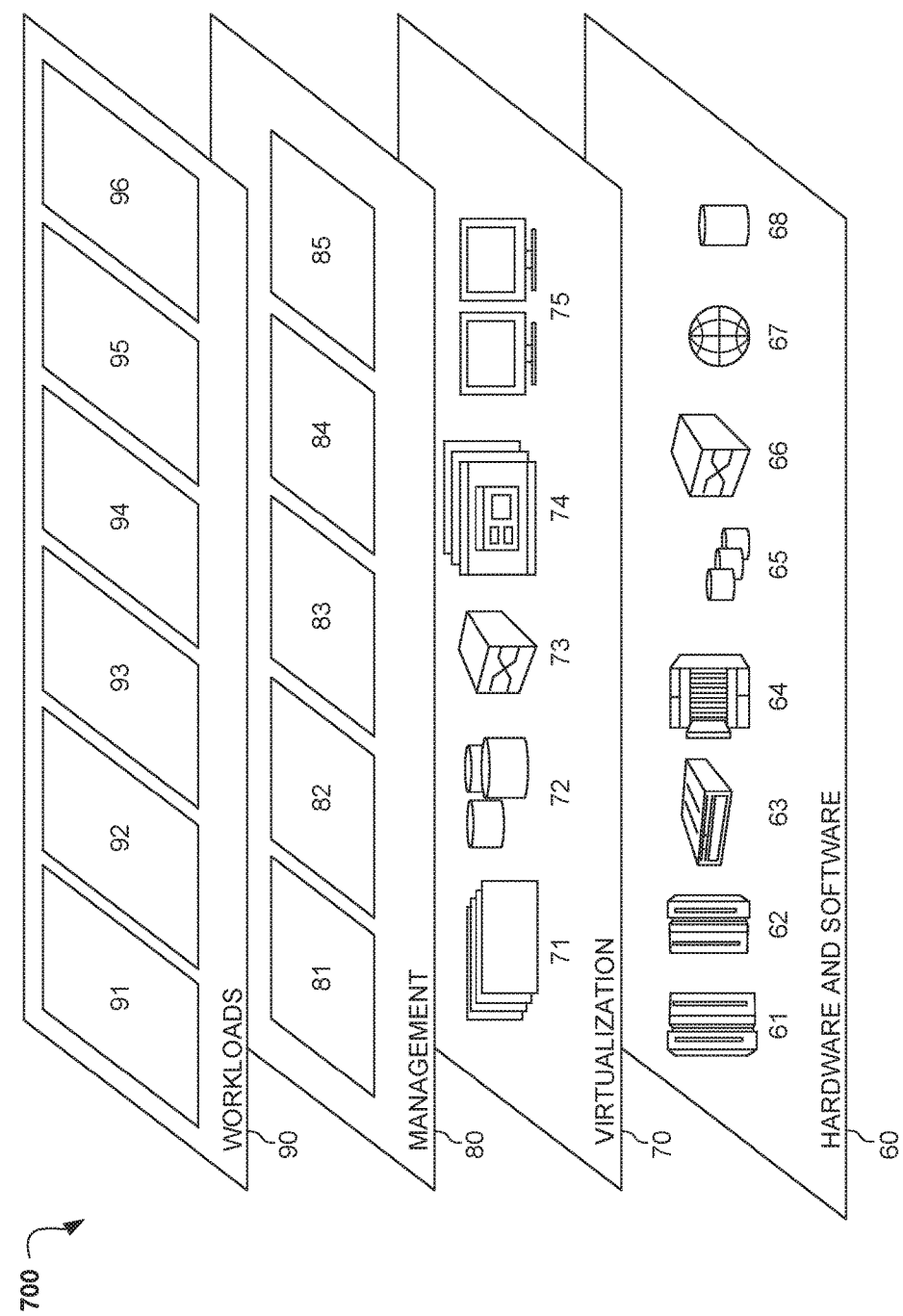
FIG. 7 depicts abstraction model layers according to an embodiment of the present invention.

Referring now to FIG. 7 a set of functional abstraction layers 700 provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and on-premises process brokering 96. On-premises process brokering may relate to processing multiple REST calls on a server that hosts a system of record. Furthermore on-premises process brokering may include implementing programming logic to create and execute REST calls on the system of record.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for implementing an on-premises process broker, the computer system comprising:
   one or more processors, one or more computer-readable memories, one or more computer-readable tangible non-transitory storage media, and program instructions stored on at least one of the one or more tangible non-transitory storage media for execution by at least one of the one or more processors via at least one of the one or more memories, wherein the computer system is configured to perform a method comprising:
   receiving, and storing in a cache, a plurality of parameter data from a system of engagement, wherein the plurality of received parameter data includes a query goal;
   preparing, from the cache, a first representational state transfer (REST) call, in an on-premises process broker, using a plurality of programming logic based on the plurality of stored parameter data;
   transmitting the prepared first REST call to a system of record;

receiving a plurality of response data from the system of record based on the transmitted first REST call, wherein the plurality of response data identifies a product;

in response to the query goal being satisfied based on the received plurality of response data, transmitting the received plurality of response data to the system of engagement;

in response to the query goal not being satisfied based on the received plurality of response data, preparing and transmitting, iteratively, a plurality of subsequent REST calls to the system of record or an alternate system of record based on the plurality of response data, wherein the preparing and the transmitting is asynchronous to the transmitted first REST call, performed in the on premises process broker, and performed before returning results of the system of engagement, and wherein assembly of information resulting from early operations is queued in a cache until all necessary inputs are available to prepare the corresponding REST call;

updating the plurality of stored parameter data in the cache based on the plurality of received response data and a plurality of subsequent response data from the subsequent REST call; and in response to the query goal being satisfied after receiving the plurality of subsequent response data from the subsequent REST call, transmitting the plurality of updated parameter data to the system of engagement based on determining the query goal is satisfied.

2. The computer system of claim 1, wherein updating the plurality of stored parameter data includes storing the plurality of received response data in the cache.

3. The computer system of claim 1, wherein the plurality of parameter data is a plurality of user-submitted data submitted through a graphical user interface.

4. The computer system of claim 3, wherein the plurality of user-submitted data is selected from a group consisting of a picture, a video, a barcode, and a quick response code.

5. The computer system of claim 1, wherein the system of engagement is a mobile application for a corresponding retailer.

6. The computer system of claim 1, wherein the plurality of parameter data is received in a JavaScript Object Notation document.

7. A computer program product for implementing an on-premises process broker, the computer program product comprising:

one or more computer-readable tangible non-transitory storage media and program instructions stored on at least one of the one or more tangible non-transitory storage media, the program instructions executable by a processor, the program instructions comprising:

program instructions to receive, and store in a cache, a plurality of parameter data from a system of engagement, wherein the plurality of received parameter data includes a query goal;

program instructions to prepare, from the cache, a first representational state transfer (REST) call, in an on-premises process broker, using a plurality of programming logic based on the plurality of stored parameter data;

program instructions to transmit the prepared first REST call to a system of record;

program instructions to receive a plurality of response data from the system of record based on the transmitted first REST call, wherein the plurality of response data identifies a product;

in response to the query goal being satisfied based on the received plurality of response data, program instructions to transmit the received plurality of response data to the system of engagement;

in response to the query goal not being satisfied based on the received plurality of response data, program instruction to prepare and transmit, iteratively, a plurality of subsequent REST calls to the system of record or an alternate system of record based on the plurality of response data, wherein the preparing and the transmitting is asynchronous to the transmitted first REST call, performed in the on premises process broker, and performed before returning results of the system of engagement, and wherein assembly of information resulting from early operations is queued in a cache until all necessary inputs are available to prepare the corresponding REST call;

program instructions to update the plurality of stored parameter data in the cache based on the plurality of received response data and a plurality of subsequent response data from the subsequent REST call; and in response to the query goal being satisfied after receiving the plurality of subsequent response data from the subsequent REST call, program instructions to transmit the plurality of updated parameter data to the system of engagement based on determining the query goal is satisfied.

8. The computer program product of claim 7, wherein updating the plurality of stored parameter data includes storing the plurality of received response data in the cache.

9. The computer program product of claim 7, wherein the plurality of parameter data is a plurality of user-submitted data submitted through a graphical user interface.

10. The computer program product of claim 9, wherein the plurality of user-submitted data is selected from a group consisting of a picture, a video, a barcode, and a quick response code.

11. The computer program product of claim 7, wherein the system of engagement is a mobile application for a corresponding retailer.

12. The computer program product of claim 7, wherein the plurality of parameter data is received in a JavaScript Object Notation document.

13. The computer system of claim 1, wherein the plurality of parameter data relates to a consumer good, and further comprising:

performing a product identification search for each product required for use of the consumer good.

14. The computer system of claim 13, further comprising:

identifying availability of various attributes of the consumer good at a user location based on the plurality of parameter data and the query goal.

15. The computer program product of claim 7, wherein the plurality of parameter data relates to a consumer good, and further comprising:

performing a product identification search for each product required for use of the consumer good.

16. The computer program product of claim 15, further comprising:

identifying availability of various attributes of the consumer good at a user location based on the plurality of parameter data and the query goal.

17. A computer system for implementing an on-premises process broker, the computer system comprising:

one or more processors, one or more computer-readable memories, one or more computer-readable tangible non-transitory storage media, and program instructions stored on at least one of the one or more tangible non-transitory storage media for execution by at least one of the one or more processors via at least one of the one or more memories, wherein the computer system is configured to perform a method comprising:
receiving, and storing in a cache, a plurality of parameter data from a system of engagement, wherein the plurality of received parameter data includes a query goal, and wherein the plurality of parameter data is received in a JavaScript Object Notation document, and wherein the plurality of parameter data relates to a consumer good, and further comprising:
performing a product identification search for each product required for use of the consumer good; and
identifying availability of various attributes of the consumer good at a user location based on the plurality of parameter data and the query goal;
preparing, from the cache, a first representational state transfer (REST) call, in an on-premises process broker, using a plurality of programming logic based on the plurality of stored parameter data;
transmitting the prepared first REST call to a system of record;
receiving a plurality of response data from the system of record based on the transmitted first REST call, wherein the plurality of response data identifies a product;
in response to the query goal being satisfied based on the received plurality of response data, transmitting the received plurality of response data to the system of engagement;
in response to the query goal not being satisfied based on the received plurality of response data, preparing and transmitting, iteratively, a plurality of subsequent REST calls to the system of record or an alternate system of record based on the plurality of response data, wherein the preparing and the transmitting is asynchronous to the transmitted first REST call, performed in the on premises process broker, and performed before returning results of the system of engagement, and wherein assembly of information resulting from early operations is queued in a cache until all necessary inputs are available to prepare the corresponding REST call;
updating the plurality of stored parameter data in the cache based on the plurality of received response data and a plurality of subsequent response data from the subsequent REST call; and
in response to the query goal being satisfied after receiving the plurality of subsequent response data from the subsequent REST call, transmitting the plurality of updated parameter data to the system of engagement based on determining the query goal is satisfied.

* * * * *